H. H. SHANNON.
TIRE PROTECTOR.
APPLICATION FILED MAR. 5, 1921.
1,423,036.
Patented July 18, 1922.
2 SHEETS—SHEET 1.
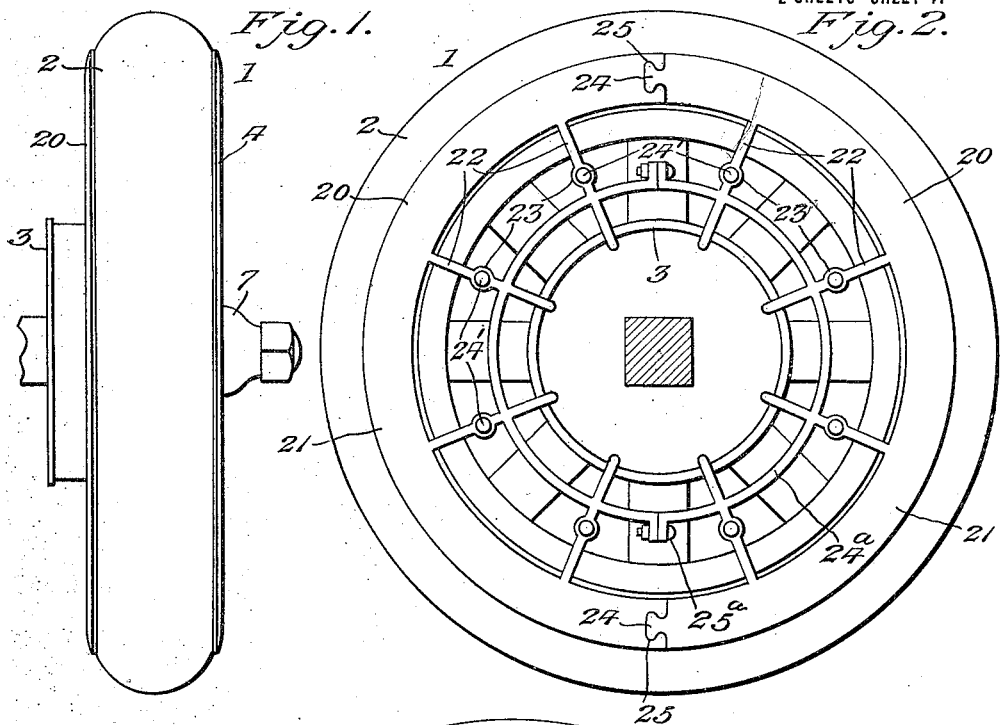
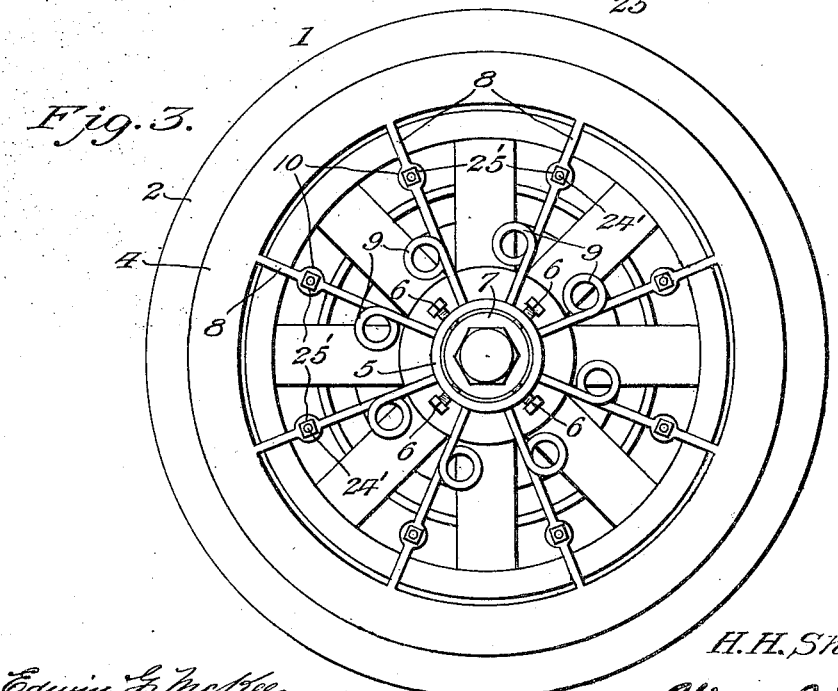
H. H. Shannon, INVENTOR
BY Victor J. Evans, ATTORNEY

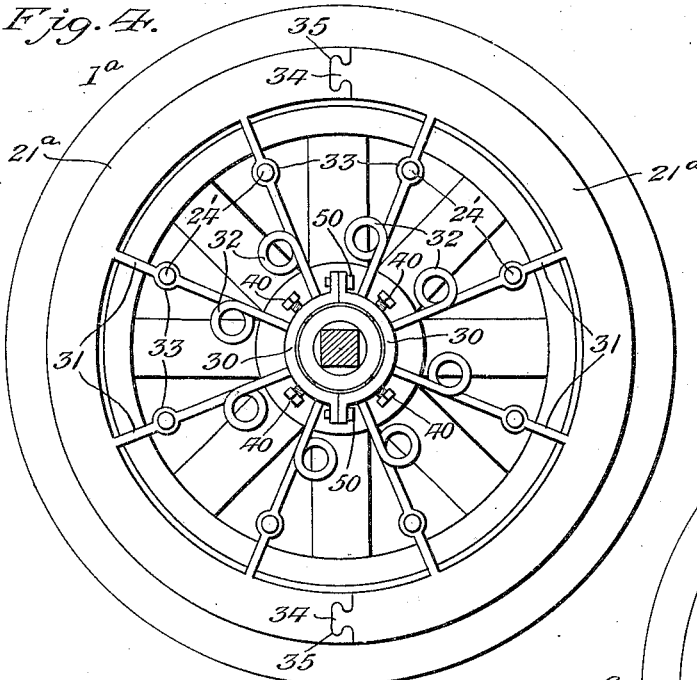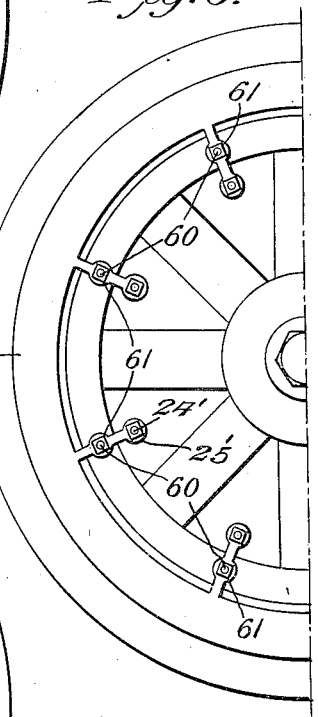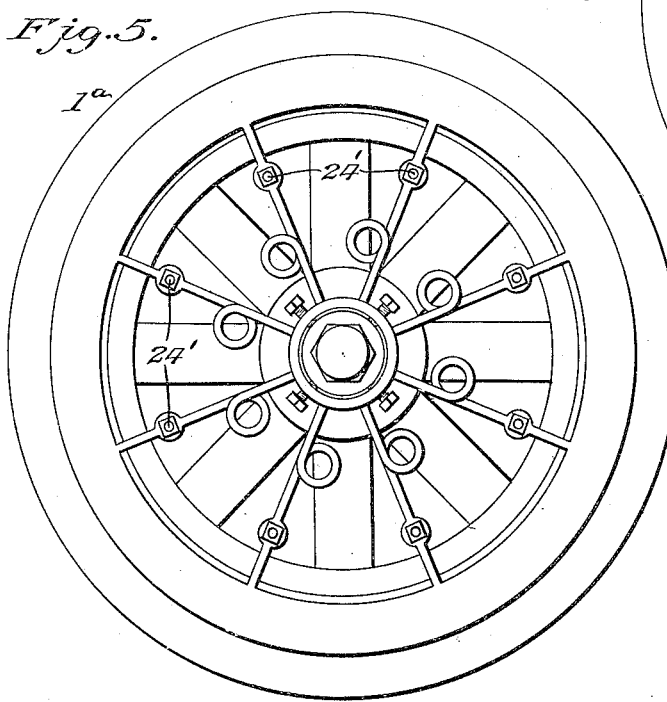

UNITED STATES PATENT OFFICE.

HOWARD H. SHANNON, OF DENVER, COLORADO.

TIRE PROTECTOR.

1,423,036.   Specification of Letters Patent.   Patented July 18, 1922.

Application filed March 5, 1921. Serial No. 449,825.

*To all whom it may concern:*

Be it known that I, HOWARD H. SHANNON, a citizen of the United States, residing at Denver, in the county of Denver and State of Colorado, have invented new and useful Improvements in Tire Protectors, of which the following is a specification.

As is well known to those experienced in the use of motor trucks the wheels thereof make deep ruts in roads, and the walls of the ruts become hard due to freezing or to the action of the sun, and when pneumatic tires traverse such ruts the rubber and cord on the sides of the tires are shredded and burned by the rut walls.

The object of my present invention is the provision of protectors adapted when properly applied to the sides of a pneumatic truck tire to avert such shredding or burning of the rubber and cord embraced in the tires.

To the attainment of the foregoing, the invention consists in the improvement as hereinafter described and definitely claimed.

In the accompanying drawings, forming part hereof:—

Figure 1 is an edge elevation of a motor truck drive wheel equipped at its sides with my novel protectors.

Figure 2 is a vertical section showing the inner side of said wheel.

Figure 3 is an elevation showing the outer side of said wheel.

Figure 4 is an elevation showing the inner side of a front wheel of a motor truck equipped with my improvement.

Figure 5 is an elevation of the outer side thereof.

Figure 6 is a view in side elevation of the outer side of a wheel, showing a modification hereinafter explicitly referred to.

Similar numerals designate corresponding parts in Figures 1 to 3 to which reference will first be made.

The motor truck drive wheel 1 shown in Figures 1 to 3 is provided with a pneumatic tire 2 and a brake drum 3, and is otherwise of the ordinary well known construction.

In furtherance of my invention I provide the said wheel at its outer side with a protective fender or guard of spring steel. The said fender or guard is made up of an outer annular portion 4 slightly curved in cross section and arranged snugly against the outer side of the tire 2, a small annular portion or collar 5, screws 6 bearing in the said collar 5 and adapted to be set against the hub 7 of the wheel, and spokes 8 interposed between and fixed to the outer annular portion 4 and the collar 5 and having spring coils 9 and also having transverse apertures 10. Manifestly when applied to a tire as shown the protective member described will preclude shredding or burning of the said side of the tire by the opposed wall of a rut traversed by the wheel.

For the protection of the inner side of the tire 2 of wheel 1 I provide the protective member best shown in Figure 2. The said protective member includes two semi-circular sections 20 so that the protective member may be applied to the wheel without the removal of the latter from its axle. Each of the said sections comprises a semi-circular portion 21 adapted to rest snugly against the inner side of the tire 2, and spokes 22 with transverse apertures 23 on said spokes 22 and adapted to be fastened to the drum 3. One of the said portions 21 of the sections 20 is provided at its ends with headed projections 24, and the other section is provided in its ends with corresponding sockets 25. From this it follows that when the sections 20 are assembled with the ends of their portions 21 in interlocked relation they will be strongly held together. I also prefer to have the sections 20 include semi-circular portions 24ª, integral with the spokes 22, and adapted to be bolted together at 25ª.

The protective member at the outer side of the wheel and the protective member at the inner side of the wheel are connected together through the medium of transverse bolts 24′ and nuts 25′ on the same; the bolts being passed through the apertures 10 and 23 of the spokes comprised in the outer and inner members.

It will be readily appreciated that when a drive wheel is equipped with my protector or protective means, the inner side of the tire as well as the outer side of the tire will be adequately guarded against shredding or burning, and this will be understood as an important advantage when attention is directed to the high cost of the casings of pneumatic truck tires.

By reference to Figures 4 and 5 it will be noted that 1ª is a front wheel of an automobile and that the said front wheel is equipped at its outer side with a protective member, Figure 5, similar to the protective member shown at the outer side of the rear wheel in Figure 3.

The protective member for the inner side of the front wheel is constructed in the manner best shown in Figure 4—i. e., is made up of two semi-circular sections 21ª, two small semi-circular sections 30, and spokes 31 interposed between and connected to the sections 21ª and 30 and having spring coils 32 and also having transverse apertures 33. One of the semi-circular sections 30 is provided with bolts 40, designed to be set against the wheel hub, and one of the small semi-circular sections 30 is provided with screw bolts 50, designed to enter threaded aperture in the other section 30 and strongly connect the two sections together. Manifestly when the sections are connected together by the interlocking of their outer semi-circular portions and by the connection of their small semi-circular portions through the medium of the bolts 50, the inner protective means will be maintained in proper relation to the inner side of the tire. It is to be understood, however, that transverse bolts 24' similar to those before described are utilized for the connection of the outer and inner protective members for a front wheel, with the result that the said protective members will be strongly and safely held in working relation to the wheel.

Notwithstanding the protective capacity of the inner and outer members of my improvement, it will be understood that the said members by reason of the resiliency thereof are not liable to materially detract from the cushioning effect of the pneumatic tire.

In Figure 6 I illustrate a protective member 4ª applicable to any type of truck wheel; the same being employed in conjunction with a plurality of studs 60 on one side of the felly, and equipped with appurtenances 61 to engage the said studs, and being designed to be connected by bolts 24' and nuts 25' with an appropriate protective member at the opposite side of the wheel.

When deemed expedient the manufacturer of my improvement may make the annular portions of the protective members—i. e., the portions opposed to opposite sides of the tire, tapered toward the free edges of the said portions, Figure 1.

Having described my invention, what I claim and desire to secure by Letters-Patent, is:—

1. The combination with a wheel having a pneumatic tire, of protective members of general annular form opposed to the sides of the tire and connected with the wheel so as to rotate therewith; the inner protective member having outer semi-circular sections the opposed ends of which are interlocked.

2. The combination with a wheel having a pneumatic tire, of protective members of general annular form opposed to the sides of the tire and connected with the wheel so as to rotate therewith; the inner protective member having outer semi-circular sections the opposed ends of which are interlocked and the outer and inner members being connected by transverse bolts.

3. Means to prevent shredding or burning of the side of a pneumatic tire comprising an annular guard adapted to be snugly arranged against the side of a tire and constructed for its connection to the wheel bearing the tire; said construction including spokes, and the spokes being coiled and resilient.

In testimony whereof I affix my signature.

HOWARD H. SHANNON.